United States Patent [19]
Mandich

[11] Patent Number: 5,632,952
[45] Date of Patent: May 27, 1997

[54] METHOD FOR LINING LATERAL AND MAIN PIPES

[76] Inventor: Ivan C. Mandich, 356 Audubon St., New Orleans, La. 70118

[21] Appl. No.: 353,567

[22] Filed: Dec. 9, 1994

[51] Int. Cl.$^6$ .............................. B29C 63/34; B29C 65/70
[52] U.S. Cl. .............................. 264/516; 138/97; 156/287; 156/294; 156/304.2; 156/304.6; 264/248; 264/269
[58] Field of Search ..................... 264/516, 269, 264/36, 248, 249; 156/287, 294, 304.2, 304.5, 304.6; 138/97

[56] References Cited

U.S. PATENT DOCUMENTS

| | | |
|---|---|---|
| 2,789,934 | 4/1957 | Busbach . |
| 3,950,461 | 4/1976 | Levens . |
| 3,958,593 | 5/1976 | Christie . |
| 4,029,428 | 6/1977 | Levens . |
| 4,434,115 | 2/1984 | Chick . |
| 4,582,092 | 4/1986 | Nissen . |
| 4,778,553 | 10/1988 | Wood . |
| 4,956,041 | 9/1990 | Miyazaki et al. . |
| 4,985,196 | 1/1991 | LeDoux et al. ............ 264/269 |
| 5,034,180 | 7/1991 | Steketee, Jr. ............ 264/269 |
| 5,194,193 | 3/1993 | Humphreys et al. . |
| 5,223,189 | 6/1993 | Friedrich ............ 264/36 |
| 5,393,481 | 2/1995 | Wood ............ 264/516 |

FOREIGN PATENT DOCUMENTS

| | | | |
|---|---|---|---|
| 0506181 | 9/1992 | European Pat. Off. . | |
| 2041147 | 9/1980 | United Kingdom ............ 264/269 |
| 2218490 | 11/1989 | United Kingdom . | |

OTHER PUBLICATIONS

Lafrentz –Rohrsanierung brochure, "Hausanschlüse".

*Primary Examiner*—Mathieu D. Vargot
*Attorney, Agent, or Firm*—George A. Bode; Bode & Associates

[57] ABSTRACT

A generally U-shaped lateral liner having a radially outwardly directed flange at its proximal end is drawn through a main pipe into a lateral pipe to be lined. A generally U-shaped main pipe liner is drawn through the main pipe to be lined, with a side wall portion overlying the radial flange of the lateral liner. Steam is supplied to reform the main liner into a generally cylindrical configuration into conformance with the interior walls of the main pipe. A pair of packers are disposed in the lined main pipe on opposite sides of the lateral pipe and a ball-like member with surface grooves is provided between the packers. Upon application of steam to the region between the packers, the steam raptures the side wall portion of the main liner, causing the ball to seat in the opening. Steam flow along the grooves at high velocity causes heat transfer to the abutting main and lateral liners to fuse the liners one to the other. Steam supplied through the grooves also reforms the lateral liner. In another form, the lateral liner and main liner may be fused together by electrofusion processes wherein electrical heating wires are provided on the flange. After fusion, a cutter cuts through the wise wall portion to form the opening between the lined main and lateral pipes.

3 Claims, 7 Drawing Sheets

METHOD FOR LINING LATERAL AND MAIN PIPES

TECHNICAL FIELD

The present invention relates to apparatus and methods for lining an underground, above-ground and other pipe networks, main pipe and a lateral pipe in communication with the main pipe, with liners formed of a plastic material and particularly relates to apparatus and methods for substantially simultaneously lining the lateral and main pipes and fusing adjoining ends of the liners in the lateral and main pipes to one another, hence creating an encapsulating pipeline or partially encapsulating network where required.

BACKGROUND

Thermoplastic liners for disposition within pipelines, either initially or as repair, for protecting the internal walls of the pipeline from deterioration, corrosion and the like, have been utilized in the past. For deteriorated, corroded or damaged pipes, the liners restore the fluid transport capability of the pipes, i.e., either gas or liquid, and prevents further interior deterioration. Liners of this type and apparatus and methods for forming and installing the liners are disclosed in U.S. Pat. Nos. 4,998,871; 4,986,951; 4,985,196; 5,112,211 and 4,863,365, of common assignee herewith, the disclosures of which are incorporated herein by reference. It has, however, been a continuing problem to provide an efficient, cost-effective method and apparatus for lining a main pipeline and one or more lateral pipes and sealing the liners in the main and lateral pipes to one another at their juncture. An effort to overcome that problem is set forth in U.S. Pat. No. 4,956,051. However, there is no systematic tying of pipelines by remote control which would provide an encapsulating pipeline system.

For purposes of the present description, it will be appreciated that in most pipelines, there is a main pipe which has one or more lateral pipes in communication with the main pipe at longitudinally spaced positions along the main pipe. In connection with the lining of gravity sewer pipes, the terms "main pipe" and "lateral pipe" or "laterals" are frequently used. In connection with the transmission of gases or fluids, for example, natural gas, for industrial purposes, the nomenclature typically refers to a main pipe and a branch pipe. As used herein, the term "branch pipe" is used synonymously with the term "lateral pipe" or "lateral" and thus these terms embrace both gravity sewer pipes, as well as industrial pipeline applications for the transmission of fluid or gas. Also, in these applications, the diameter of the pipe is typically equal to or less than the diameter of the main pipe. The term "encapsulating" means enclosing the system without excavation or access to the main line or branches and preventing inflow or outflow of any liquids in the pipeline.

It will be appreciated that at the juncture of an underground main pipe and a lateral pipe, there is an opening affording communication between the two pipes. It is known to line a main pipe with a liner of plastic material in accordance with any one of the above-identified patents, as well as to line a lateral pipe in accordance with a similar procedure. Also, the juncture of the main and lateral liners should be sealed to prevent ingress of gases, fluids or other materials into the lined pipes from sources external to the main and lateral pipes, as well as egress of the fluid or gas from the lined pipes at their juncture. Many pipes fined with plastic materials using the above-identified known methods employ a cutter to form the opening through the main pipe liner into the lateral pipe. However, there has been no effective way of fusing the lateral and main liners to one another at their juncture. Further, in those applications where flammable materials are transported in the main and/or lateral pipes, it is highly dangerous to employ equipment which generates sparks to seal the main and lateral liners one to the other. Such sparks could cause an underground explosion, even when the main and lateral pipes are purged of the flammable material, because residual flammable material oftentimes remains.

DISCLOSURE OF THE INVENTION

In accordance with the present invention, there is provided apparatus and methods for essentially simultaneously lining main and lateral pipes with liners of plastic material and sealing the juncture between the main and lateral liners. Moreover, this is accomplished with equipment which will not generate sparks or flame which might cause any flammable material to ignite or explode. Also, the majority of the work in both lining the main and lateral pipes and fusing the liners is accomplished by working through the main pipe rather than the lateral pipe and hence minimizing intrusion at the opposite end of the lateral pipe. While the preferred embodiment provides lining and sealing underground pipes and laterals in situ, it will be appreciated that above-ground pipes may be lined and sealed in accordance with the principles of this invention.

To accomplish this, a lateral liner, generally U-shaped in cross-section as set forth in the above-mentioned patents, is drawn into a main pipeline and into a lateral of the main pipe by a lead line coupled to the forward end to the lateral liner. The distal end of the lateral liner has a cylindrical section of limited length, terminating in a radially outwardly directed flange having a diameter greater than the interior diameter of the lateral pipe. A metal ring may be built at the rim of the cylindrical section to provide a guide for the operation of the cutters. When provided, the lateral liner has been drawn into the lateral pipe to its full extent, it will be appreciated that the annular flange bears against the inner wall of the main pipe about the lateral pipe opening. The annular flange lies in a plane, while the inner wall of the main pipe forms the arc of a circle normal to the plane whereby only edges of the flange diametrically opposed to one another contact the main pipe wall, while the remaining portions of the flange are spaced from the arcuate interior wall of the main pipe.

After the lateral liner is positioned, the generally U-shaped main liner is drawn through the main pipe past the juncture of the main and lateral pipes and past the flange of the lateral liner. The main pipeline is then reformed into a generally cylindrical configuration into contact with the interior walls of the main pipe, using the apparatus and processes described in the previously mentioned patents. That is, steam under pressure and at a predetermined temperature, is introduced into the main liner at one end and valved off from the opposite end of the liner, whereby the liner is reformed into a generally cylindrical configuration against the walls of the main pipe. In a preferred method, the main liner is formed of polyethylene and has shape memory characteristics whereby, upon application of the steam under pressure and at a predetermined temperature, the pipe liner remembers its original extruded cylindrical shape (historic time memory) and adapts to the shape to line the walls of the pipe. While employing a U-shaped polyethylene liner having memory characteristics is preferred, a deformed liner without such characteristics can be otherwise reformed into a generally cylindrical configuration by other means such as mechanical deformation.

With the steam pressure at a predetermined temperature within the main pipe liner, it will be appreciated that the side wall portion of the main liner bearing against the annular flange of the lateral liner will press the annular flange against the interior wall of the main pipe whereby the annular flange generally conforms to the arcuate configuration of the interior wall of the main pipe. At this stage, the side wall portion of the main pipe liner blocks the opening of the lateral liner. To form the opening in the side wall portion of the main liner to afford communication between the main liner and the lateral liner, a pair of packer assemblies or any other type of blocking space devices are inserted into the main liner in a deflated condition. The packers are drawn through the main liner and positioned on opposite sides of the juncture between the main and lateral pipes, thus straddling the juncture and the opening to be formed through the side wall portion of the liner into the lateral liner. Between the packers is a ball-like member which may be attached to one of the packers by a flexible line or chain. The member has a diameter larger than the inner diameter of the lateral liner, i.e., the internal diameter of the opening defined by the lateral liner's flange. Once the packer assemblies are located on opposite sides of the juncture of the main and lateral liners, with the ball-like member in the region between the packers, the packers are inflated to seal the liner on opposite sides of the opening. Steam is then supplied through one of the packers into the region. Because the main liner bears against the main pipe being lined except for the side wall portion in registration with the opening through the lateral liner, the steam pressure within the region ruptures or blows out that side wall portion. Upon rupturing the opening, the steam pressure within the region between the packers causes the ball-like member to substantially occlude the ruptured opening. The ball-like member, however, has a plurality of grooves along its surface. The grooves may be randomly distributed or in a pattern. Suffice to say that substantial portions of any diameter of the member have grooves passing through the plane of that diameter. When the member seats in the opening, the reduced cross-sectional area for flow through the opening causes the steam flowing along the grooves into the lateral liner to undergo a velocity change. This enables high heat transfer from the steam to the liner margins about the side wall opening of the main liner and the flange, as well as about the interior of the distal end of the lateral liner. This high heat transfer causes a temperature sufficiently high, i.e., a minimum of approximately 250° F., to fuse the plastic materials of the two liners to one another, forming a seal between the two liners. Once the seal has been formed, the steam supply is shut off, the packers deflated and the packers and member are withdrawn from the main liner.

To reform the lateral liner, the end of the lateral liner opposite the opening is closed and valved and steam is continuously supplied to the region between the packers. Thus, steam supplied to the lateral liner from the main liner through the grooves of the ball-like member reforms the lateral liner into a generally cylindrical configuration into conformance with the interior wall surface of the lateral pipe. When reformed, the steam is shut down, the packers and ball-like member are removed from the lined main pipe and the liners are completed in the conventional manner. Additionally, a cutter may be transported through the main liner to cut about the opening at the fused juncture of the main and lateral liners to ensure that the opening is fully rounded and to remove debris and any ragged edges caused by the bursting of the main liner side wall portion.

In another embodiment hereof, the flange of the lateral liner may carry an electrofusion annulus. The annulus has electrical heating wires through and around it. Alternatively, for liners formed of high molecular weight material, such as polyethylene, an electrical connection may be made to the flange. Thus, for lower density liner material, rings of electrical heater wires are provided in an electrofusion annulus about the flange whereas, when higher density liner material is used, only an electrical connection with the flange is necessary. After the main liner has been reformed using the processes noted above, electrical power is applied to the annulus to fuse the lateral liner and the main liner one to the other. To form the opening, a cutter can be inserted into the main liner to cut the side wall portion thereof occluding the lateral liner opening. The lateral liner is then reformed into a generally circular configuration by applying steam for flow through the lateral liner in accordance with the previously described processes.

In a preferred embodiment according to the present invention, there is provided a method of forming in situ an opening through a side wall portion of an elongated liner disposed in a main pipe wherein the side wall portion lies in registry with a lateral pipe adjoining the lined main pipe to provide communication through the opening between the lined main pipe and the lateral pipe, comprising the steps of substantially sealing the elongated liner on opposite sides of the juncture between the lined main pipe and the lateral pipe to define a substantially closed region within the liner and flowing a fluid under pressure and at a predetermined temperature into the closed region of the liner to burst the side wall portion of the liner to form the opening.

In a further preferred embodiment according to the present invention, there is provided a method of sealing an end of a liner disposed in a lateral pipe in communication through an opening with an elongated pipe at the juncture of the lateral pipe and elongated pipe and a side wall portion of a liner in the elongated pipe, both liners being formed of a plastic material, comprising the steps of disposing a lateral liner in the lateral pipe with an end thereof carrying a flange disposed within the elongated pipe, disposing an elongated liner in the elongated pipe with wall portions thereof overlying the flange within the elongated pipe, thereby locating the flange between the elongated liner and margins of the elongated pipe about the opening and fusing the flange and the liner wall portions overlying the flange to one another.

In a further preferred embodiment according to the present invention, there is provided apparatus for forming an opening through a side wall portion of an elongated liner disposed in a main pipe wherein the side wall portion lies in registry with a liner in a lateral pipe adjoining the fined main pipe to provide communication between the lined main pipe and the lined lateral and to fuse the liners to one another at their juncture about the opening pipe, comprising a pair of packers for insertion into the lined main pipe and sealing the elongated liner on opposite sides of the juncture between the lined main pipe and the lined lateral pipe to define a substantially closed region within the lined main pipe between the packers and means for flowing steam under pressure at a predetermined temperature into the closed region to burst the side wall portion of the liner to form the opening. Also provided is a member in the closed region between the packers and having passages for directing a fluid under pressure at a predetermined temperature against the respective liners of the main and lateral pipes at their juncture about the opening to fuse the liners to one another.

In a still further preferred embodiment according to the present invention, there is provided apparatus for fusing a side wall portion of an elongated liner disposed in a main pipe in registry with a liner in a lateral pipe adjoining the lined main pipe, comprising a flange formed on an end of the lateral liner, an electrofusion annulus carried by the flange and means for supplying electrical energy to the electrofusion annulus for fusing the flange and the side wall portion to one another.

In a still further preferred embodiment according to the present invention, there is provided apparatus for fusing a side wall portion of an elongated liner disposed in a main pipe in registry with a liner in a lateral pipe adjoining the lined main pipe, comprising a flange formed on an end of the lateral liner, the lateral liner including the flange being formed of a high molecular weight polyethylene and means for supplying electrical energy to the flange for fusing the flange and the side wall portion to one another.

Accordingly, it is a primary object of the present invention to provide novel and improved apparatus and methods for substantially simultaneously lining main and lateral pipes and fusing the juncture of the linings in those pipes to one another.

BEST MODE FOR CARRYING OUT THE INVENTION

Reference will now be made in detail to a present preferred embodiment of the invention, an example of which is illustrated in the accompanying drawings.

Figure 1:
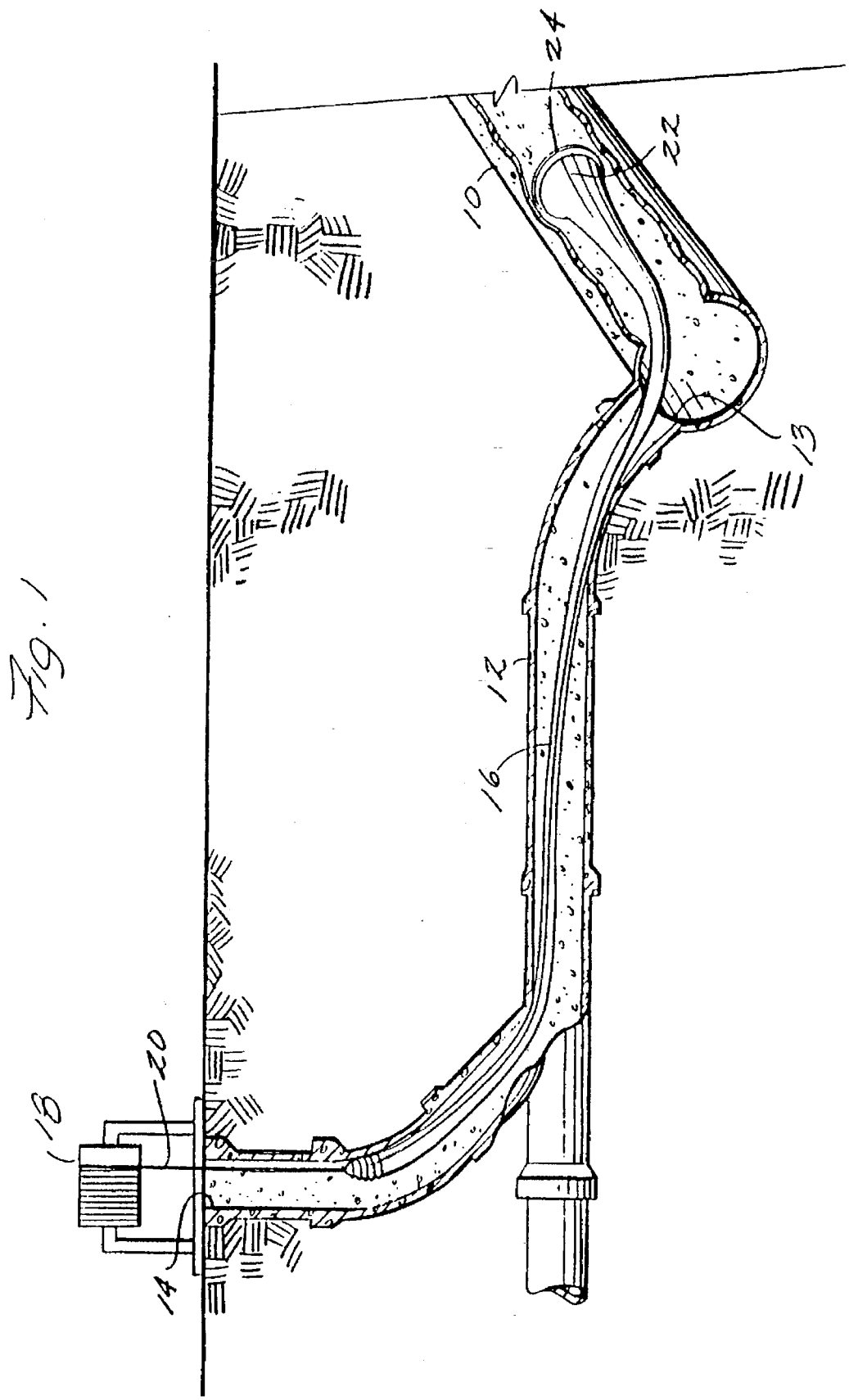
FIG. 1 is a schematic perspective illustration of a lateral liner being pulled through a main pipe to initiate the lining of the main pipe and a lateral pipe in accordance with the present invention.

Referring now to the drawings; particularly to FIG. 1, there is illustrated an underground main pipe 10 and a lateral pipe 12 joined at an opening 13. Lateral pipe 12 has an access opening 14 aboveground and, of course, the main pipe has access openings, for example, in the form of manholes, at its opposite ends or at spaced locations along its length.

While the invention described herein employs a generally U-shaped liner formed of plastic material such as polyethylene having shape memory characteristics, the invention is applicable to other liner materials and processes of reformation, the shape memory characteristics of the polyethylene pipe liner being only the preferred method of reforming the liners as part of the present invention. In the preferred form, and as illustrated in FIG. 1, a generally U-shaped lateral liner 16 is drawn through the main pipe 10 from an open end thereof and into the lateral pipe 12, for example, by a winch 18 having a lead line 20 coupled to the distal end of the lateral liner 16. The proximal end of the liner 16 has a short length 22 in a generally cylindrical configuration, terminating in a radially outwardly directed flange 24. The diameter of the cylindrical portion 22 approximates the internal diameter of the lateral pipe 12 at its juncture with the main pipe 10, while the radial flange 24 has a larger diameter than the diameter of the lateral pipe 12.

Figure 2:
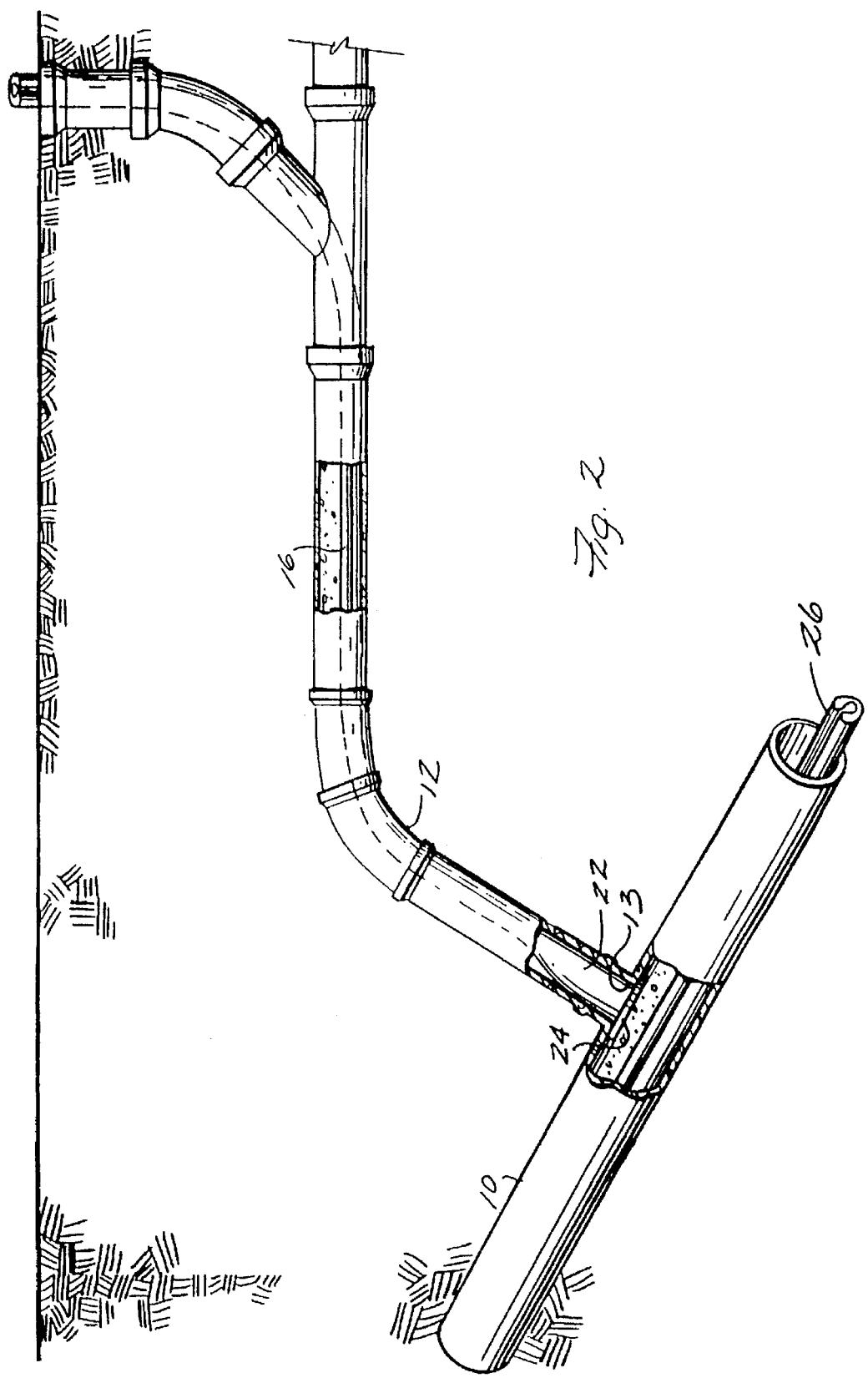
FIG. 2 is a perspective schematic view illustrating the lateral liner disposed in the lateral pipe and the main liner in the main pipe prior to their reformation into cylindrical pipe linings fused one to the other at their juncture.
Figure 3:
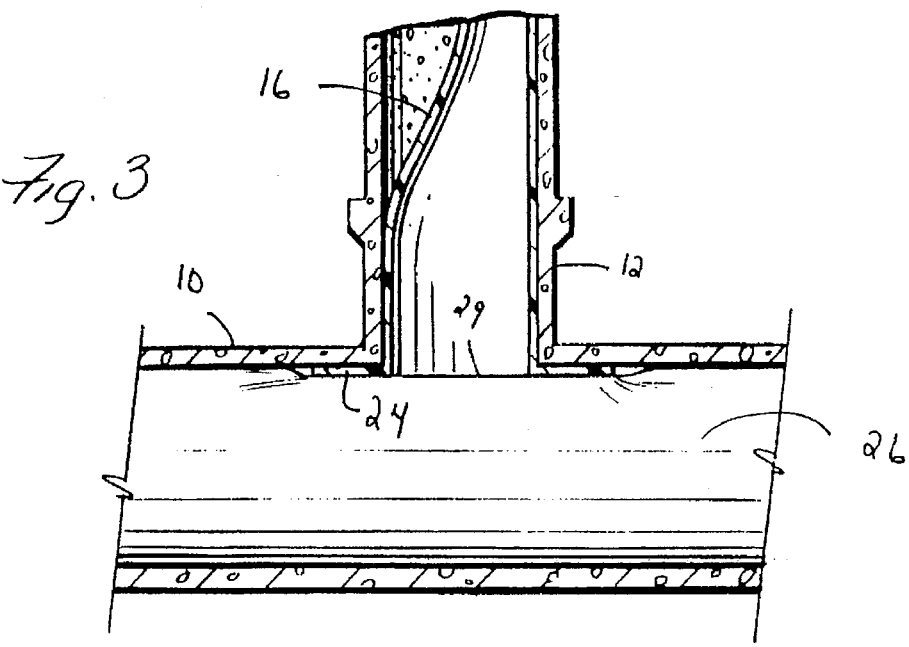
FIG. 3 is a cross-sectional view illustrating the radially outwardly directed flange of the lateral liner between the main pipe wall and the main liner wall.
Figure 4:
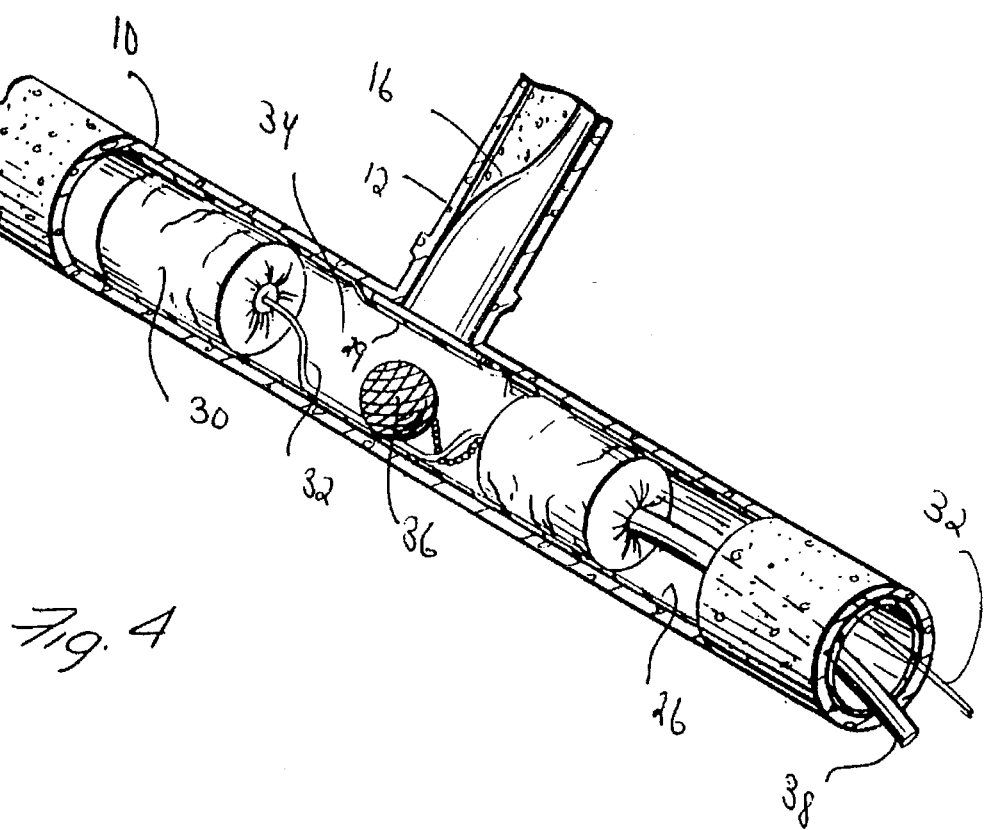
FIG. 4 is a fragmentary perspective view illustrating the main liner reformed into its cylindrical configuration with the packer and ball-like member assembly in place to rupture the opening through the side wall portion of the main liner.
Figure 5:
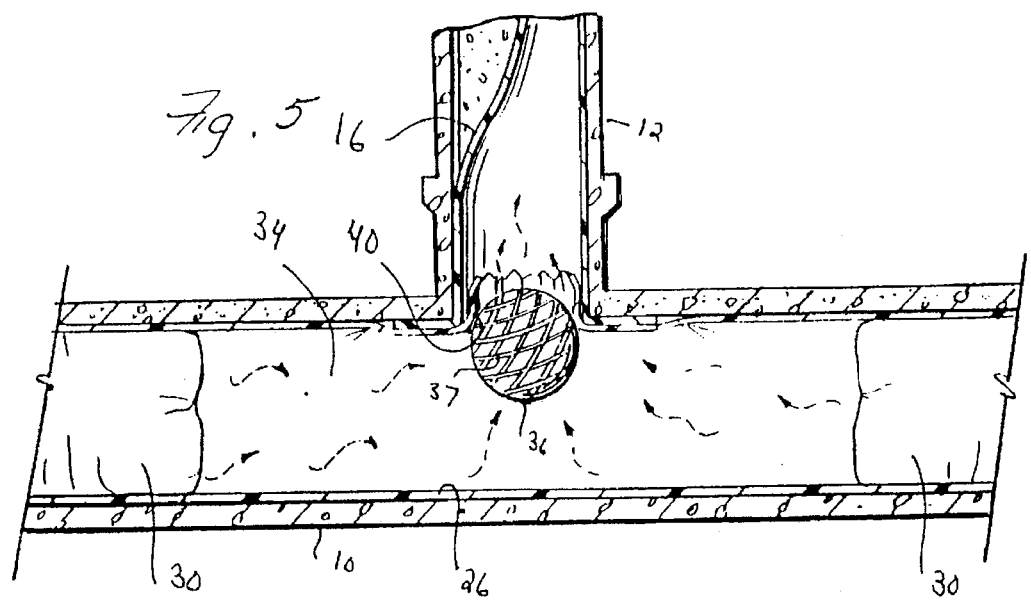
FIG. 5 is a fragmentary cross-sectional view illustrating the rupture of the side wall portion of the main liner with the ball-like member disposed in the ruptured opening.

As illustrated in FIG. 2, the lateral liner 16 extends through the lateral pipe 12 with the flange 24 drawn up against the interior wall of the main pipe 10. After the lateral liner 16 is in place, as described and illustrated in FIG. 2, the generally U-shaped main liner 26 is drawn into the main pipe 10 from one end thereof and extends past the juncture with the lateral pipe, for example, to another access opening. Once positioned, the opposite ends of the main liner 26 are closed and steam at a predetermined pressure and temperature, for example, as set forth in U.S. Pat. No. 4,998,871, is supplied at one end and valved at the opposite end. Because the polyethylene liner 26 preferably has shape memory characteristics, the application of steam at predetermined temperature and pressure reforms the liner 26 into its generally cylindrical configuration into conformance with the interior walls of the main pipe 10. As illustrated in FIG. 3, the exterior wall of the liner 26, when reformed, bears against the outer surface of flange 24. The pressure of the steam is sufficient to bend the flange 24 into conformance with the arcuate interior wall of the pipe 10, the lateral liner 16 remaining in its generally U-shaped configuration.

To form the opening through the side wall portion 29 of the main liner 26 in registration of the opening in the lateral liner defined by flange 24 and thereby afford communication between the liner 26 and lateral liner 16, a pair of inflatable packers 30 are drawn through the main liner 26 in a deflated condition to lie on opposite sides of the juncture of the lateral and main pipes. The packers are preferably connected to one another at a predetermined spacing and are pneumatically inflated, for example, by a air supply line 32 connected to an air supply source, not shown. By inflating the packers 30, the main pipe is sealed on opposite sides of the juncture of the main and lateral pipes. The packers thus define a closed region 34 between them which includes the side wall portion 29 of the main liner 26 overlying the lateral liner 16.

Disposed between the packers 30 is a ball-like member 36. The ball-like member 36 is preferably formed of a lightweight material, may be hollow and evacuated within its interior, and has a plurality of grooves 37 formed along its surface. The grooves 37 may be formed in a random pattern or a predetermined pattern. The grooves, however, cover substantially the entire surface of the ball-like member and are closely spaced one with the other. Further, the ball-like member preferably constitutes a sphere but may be an oblate spheroid or have other shapes sufficient for the purposes described herein.

Figure 6:
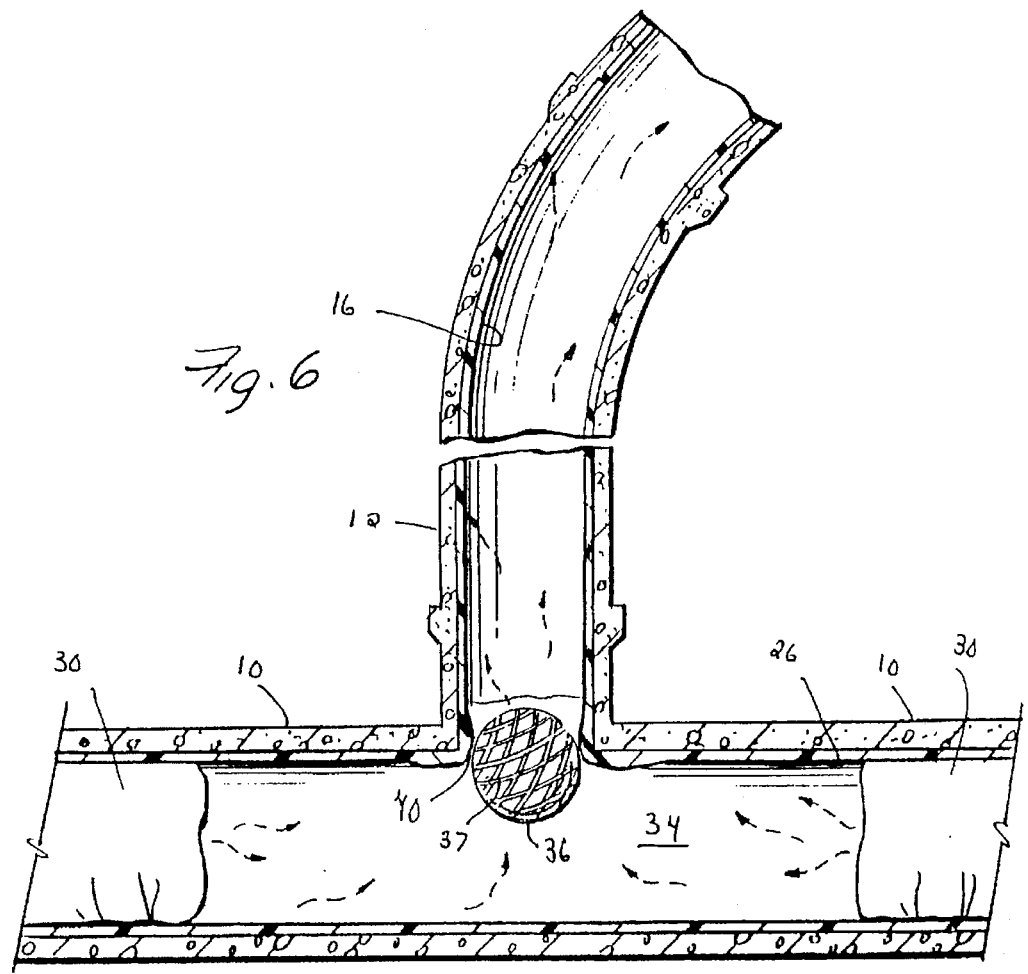
FIG. 6 is an enlarged view similar to FIG. 5 illustrating the reformation of the lateral liner by steam supplied through the packers and the grooves of the ball-like member.
Figure 7:
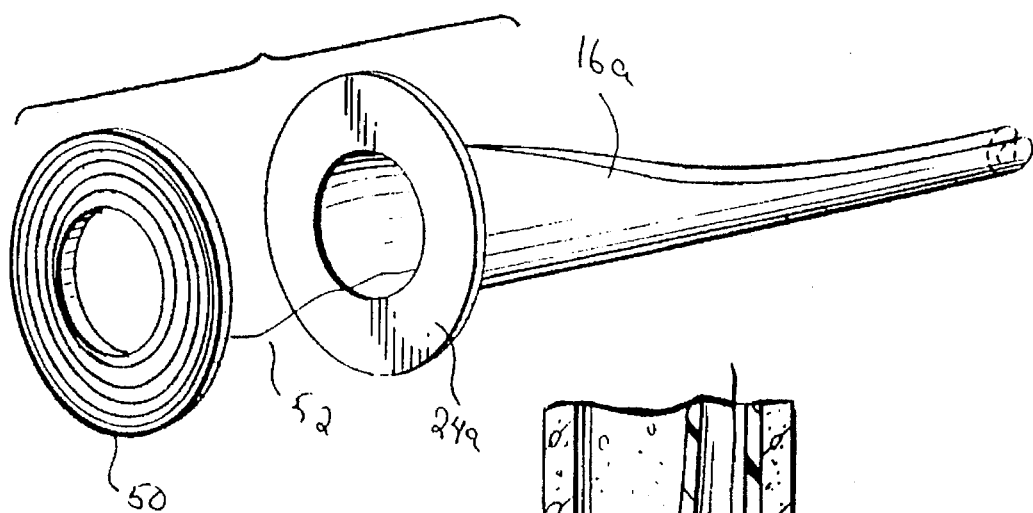
FIG. 7 is a perspective view of an end of a lateral liner in accordance with another embodiment of the present invention.

To form the opening, the inflated steam is supplied via a steam supply line 38 into region 34 between the inflated packers 30 at similar pressure and temperature used previously to reform the main liner 26. The steam in the region 34 has sufficient temperature and pressure to rupture the side wall portion 29 of the liner 26, causing the ruptured portions to project or blow out into the end opening of the lateral liner 16. Substantially immediately upon rupture, the ball-like member 36 is displaced into the opening by the outward rush of steam into the lateral liner 16. Because the member 36 substantially occludes the opening 40 thus formed, the steam passes through and along the grooves 37 from the region 34 into the lateral liner 16. By reducing the cross-sectional area of the flow passage through opening 40 and between the region 34 and lateral liner 16, the velocity of the steam substantially increases as it passes through the grooves adjacent the opening. This increased steam velocity causes the steam to have a high heat content and transfer rate to the plastic materials about the opening 40, thereby fusing the material of the main liner 26 forming the opening and the flange as well as adjacent portions of the lateral liner 16. As illustrated in FIG. 6, the lateral liner and main liner are thus fused together, with the ball residing in the opening 40.

With the opening formed, steam continues to pass from region 34 through the grooves 37 of the ball-like member 36 into the lateral liner 16. It will be appreciated that prior to supplying steam to region 34, the lateral liner 16 is closed at its opposite end and valved. Thus, the steam at predetermined pressure and temperature flowing through grooves 37 in the lateral liner 16 causes it to reform into its cylindrical configuration into general conformance with the interior walls of the lateral pipe 12. Once reformed, and the steam supply is shut down, the packings 30 and ball-like member 36 are removed from the main liner. A cutter may then be disposed in the main liner to clean the margin of the opening 40 of any debris and projecting fragments of the ruptured main liner.

Figure 8:
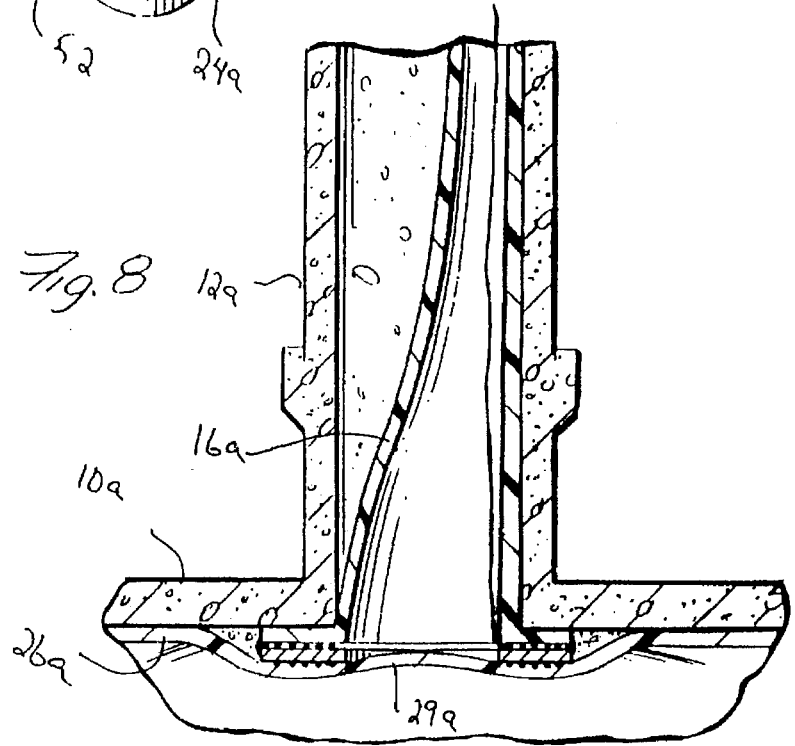
FIG. 8 is a fragmentary cross-sectional view of the end of the lateral liner disposed in a lateral pipe with the flange in the main pipe in accordance with this second embodiment.
Figure 9:
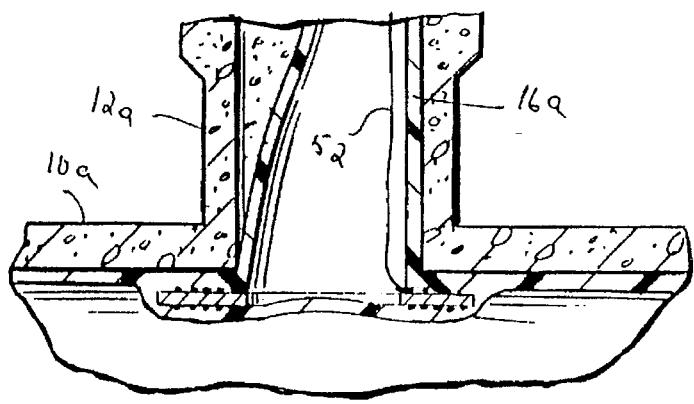
FIG. 9 is a fragmentary cross-sectional view illustrating the fused connector between the lateral and main liners.
Figure 10:
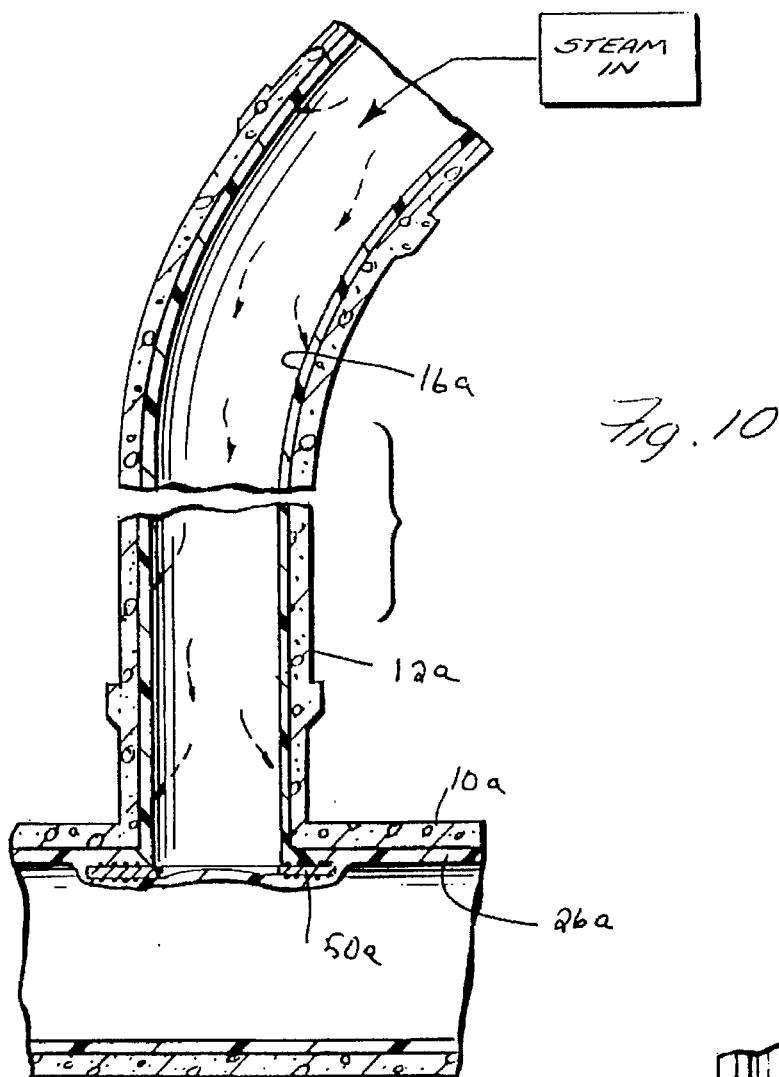
FIG. 10 is a fragmentary cross-sectional view illustrating the reformation of the lateral liner by steam supplied at its distal end.
Figure 11:
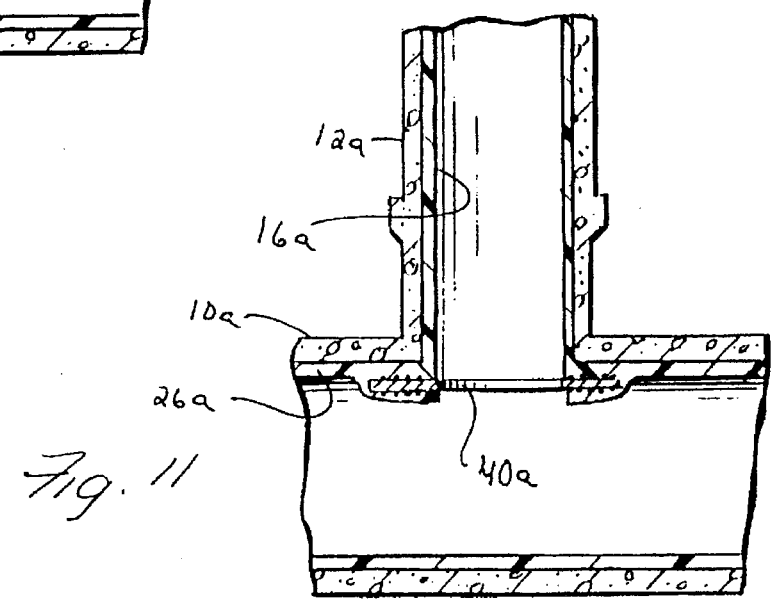
FIG. 11 is a fragmentary dross-sectional view of the joint as completed, with the opening formed through the side wall portion of the main liner.

Turning now to the embodiment hereof illustrated in FIGS. 7–10, wherein like reference numerals are employed to denote like parts, followed by the suffix "a", there is illustrated a lateral liner 16a having a radially outwardly directed flange 24a at its proximal end with an electrofusion annulus 50 carded on the end face of flange 24a. An electric wire 52 extends along the lateral liner 16a for connection to an electrical source, not shown, external to liner 16a. As illustrated in FIG. 8, generally U-shaped lateral liner 16a is disposed in lateral pipe 12a and a generally U-shaped main liner 26a is similarly disposed in a main pipe 10a and reformed, as previously described, into a generally circular configuration. Thus, in FIG. 8, the side wall portion 29a of the main liner 26 overlies electrofusion annulus 50. As in the previous embodiment, the flange 24a and here also the annulus 50 are shaped into an arcuate configuration by the steam pressure applied to the main liner 26a to conform to the arcuate wall of the main pipe 10a. By applying electricity to the wires of the electrofusion annulus, sufficient heat is generated to fuse the radial flange 24a and the main liner portion 26a one to the other as illustrated in FIG. 9. Once the main and lateral liners are fused one to the other, the lateral liner can be reformed, either before or after the opening 40a is formed through the main liner side wall portion. For example, the lateral liner 16a may be-reformed prior to forming the opening through the main liner. To accomplish that, the distal end of the lateral liner is closed and steam is supplied at that closed end, as illustrated in FIG. 10. By supplying steam at appropriate pressure and predetermined temperature, similarly as previously done in the main liner, the lateral liner is reformed into its generally cylindrical configuration into conformance with the interior walls of the lateral pipe 12a. After the lateral liner is reformed and the steam cut off, the side wall portion 29a of the main liner may be cut-away by using a cutter from within the main liner. If the cutter is used, it is preferable to line the interior of the flange 24a with a metal ting to prevent the cutter from damaging the fused portions of the lateral and main liners.

Figure 12:
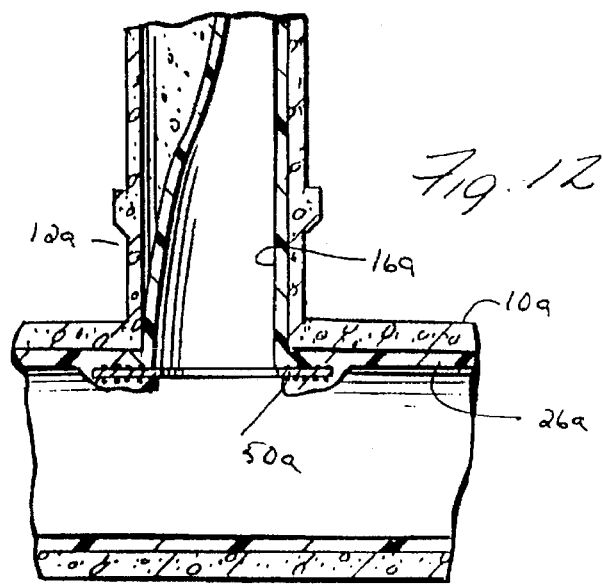
FIG. 12 is a view similar to FIG. 9.
Figure 13:
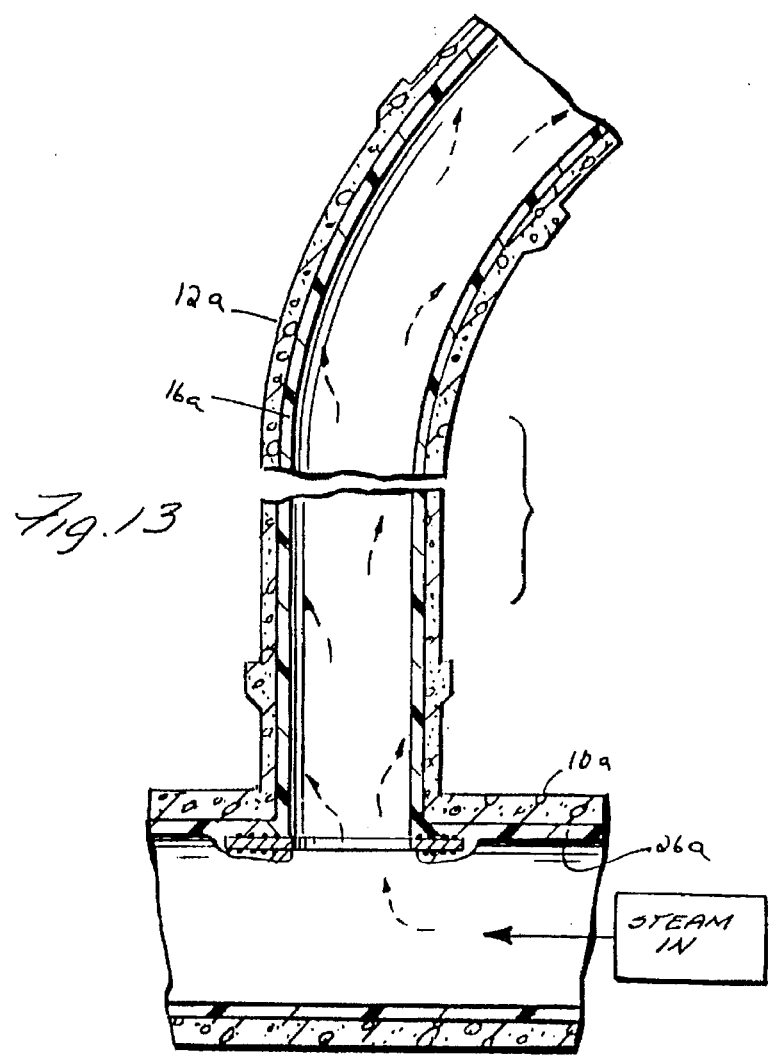
FIG. 13 is a view similar to FIG. 10 but illustrating the reformation of the lateral by steam supplied through the main liner and opening into the lateral liner.

Referring to FIGS. 12 and 13, the opening through the side wall portion 29a of the main liner 26a may be formed by the cutter from within the main liner prior to reforming the lateral liner 16a. In this case, once the opening 40a is formed, steam can be provided in the main liner similarly as previously described for flow into the lateral liner, the distal end of the lateral liner being closed and valved. The steam at predetermined pressure and temperature thus reforms the lateral liner similarly as previously described.

The electrofusion process, as described herein, may be used with any of the various molecular weights of the polyethylene lining materials. For high molecular weight material, however, heating wires about the flange are not necessary. For flanges formed of high molecular weight plastic materials, an electric wire need only be connected to the flange. By applying electricity to the high molecular weight material forming the flange, the flange may be directly fused to the surrounding plastic materials.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A method of forming in situ an opening through a side wall portion of an elongated liner disposed in a main pipe wherein the side wall portion lies in registry with a lateral pipe adjoining the lined main pipe to provide communication through the opening between the lined main pipe and the lateral pipe, comprising the steps of:

substantially sealing the elongated liner on opposite sides of the juncture between the lined main pipe and the lateral pipe to define a substantially closed region within the liner;

flowing a fluid under pressure and at a predetermined temperature into the closed region of the liner to burst the side wall portion of the liner to form said opening;

disposing a liner in the lateral pipe and sealing an end of the lateral pipe liner adjacent said opening to marginal portions of the liner of the main pipe about said opening;

wherein said liners are formed of a plastic material, wherein the step of sealing includes fusing the end of the lateral pipe liner and the marginal portions of the liner of the main pipe about said opening, and further comprising the step of disposing a member in said closed region for disposition about said opening, using said member to direct the fluid to fuse the end of the lateral pipe liner and the marginal portions of the liner of the main pipe about said opening.

2. A method according to claim 1 including establishing at least one flow path for the fluid through said member to direct the fluid to fuse the liners to one another.

3. A method according to claim 2 including establishing a plurality of flow paths for the fluid through the member to direct the fluid to fuse the liners to one another about the opening.

* * * * *